United States Patent [19]

Hubert

[11] 4,275,861

[45] Jun. 30, 1981

[54] ORIENTATION OF MOMENTUM STABILIZED VEHICLES

[75] Inventor: Carl H. Hubert, East Windsor, N.J.

[73] Assignee: RCA Corporation, New York, N.Y.

[21] Appl. No.: 931,172

[22] Filed: Aug. 4, 1978

[51] Int. Cl.³ .......................... B64G 1/28; B64G 1/38
[52] U.S. Cl. ..................................... 244/165; 244/170
[58] Field of Search ............... 244/164, 165, 3.2, 3.21, 244/170

[56] References Cited

U.S. PATENT DOCUMENTS

| | | | |
|---|---|---|---|
| 3,591,108 | 7/1971 | Perkel et al. | 244/165 |
| 3,940,096 | 2/1976 | Keigler et al. | 244/165 |
| 4,071,211 | 1/1978 | Muhlfelder et al. | 244/165 |

OTHER PUBLICATIONS

Franklin et al., "A High Power Communications Technology Satellite for the 12- and 14-GHz Bands", AIAA Paper 72-580, AIAA 4th Communications Satellite Systems Conference, Washington, D.C., 4/24–26/1972, pp. 87, 92, 113.

"Flywheel Stabilized, Magnetically Torqued Altitude Control System for Meteorological Satellites Study Program", NASA CR-232, 5/1965, pp. 3.7-3–3.7-5.

Primary Examiner—Barry L. Kelmachter
Attorney, Agent, or Firm—Samuel Cohen; Joseph D. Lazar; Robert L. Troike

[57] ABSTRACT

A preselected axis other than the axis of maximum moment of inertia of a momentum stabilized spacecraft is oriented for alignment with the total angular momentum vector of the spacecraft by rotating one or more rotors to a critical rate of rotation. The rotation of the rotor or rotors is maintained at the critical rate to effect the desired rotation. The axis of the rotor or the effective angular momentum vector of the resultant momentum of a plurality of rotors is aligned with the axis of the desired spacecraft orientation. Energy dissipation assures stability by dissipating energy on the spacecraft body at a faster rate of dissipation than the rate of energy dissipation on the rotor.

12 Claims, 11 Drawing Figures

ORIENTATION OF MOMENTUM STABILIZED VEHICLES

This invention relates to angular momentum stabilized spacecraft and more particularly to the reorientation of such spacecraft from any attitude.

Spacecraft are launched from ground based launch platforms and propelled or carried into space by launch vehicles. The launch vehicle is sequentially separated into any one of several sections as required to finally inject the spacecraft into its own orbit with or without spin imparted to the spacecraft.

The literature includes analysis of a simple open loop procedure for acquiring a stable dual-spin configuration about a spacecraft's minimum or intermediate moment-of-inertia axis when the spacecraft is initially in a state of simple spin about the maximum-moment-of-inertia axis. Reorientation is accomplished by torquing a momentum wheel until it reaches a speed consistant with stability requirements for the nominal operational orientation. Reaction torques applied to the spacecraft during wheel spin-up produce most of the required attitude change. Perfect alignment of the wheel axis with the angular momentum vector, however, cannot be achieved by open loop wheel torquing alone. A residual nutation will essentially always be present. Theoretically it is possible to achieve as small a nutation as desired by spinning-up the wheel using a very low motor torque. Zero nutation, however, would require a torque so low that spin-up time would be infinite (i.e., zero residual nutation requires zero spin-up torque). Since the dual-spin configuration is stable, however, ultimate convergence to a system without residual nutation can be effected by incorporating one or more energy dissipation mechanisms in the spacecraft. For further descriptions of these principles see the following references (1) Kaplan, M. H. and T. C. Patterson, "Attitude Acquisition Maneuver for Bias Momentum Satellites," *COMSAT Technical Review*, vol. 5, No. 1, Spring 1976, pp. 1–23; (2) Gebman, J. R. and D. L. Mingori, "Perturbation Solution for the Flat Spin Recovery of a Dual-Spin Spacecraft," AIAA Journal, vol. 14, No. 7, July 1976, pp. 859–867; (3) Barba, P. M. and J. N. Aubrun, "Satellite Attitude Acquisition by Momentum Transfer," AIAA Journal, vol. 14, No. 10, October 1976, pp. 1382–1386; and (4) Kaplan, M. H., *Modern Spacecraft Dynamics and Control*, John Wiley & Sons, 1976, pp. 367–379.

In addition, see U.S. Pat. No. 3,940,096 entitled "Re-Orientation of a Spacecraft Relative to its Angular Momentum Vector," issued on Feb. 24, 1976, to J. E. Keigler and L. Muhlfelder, which discloses a system for orienting a spacecraft from a relatively slow spin condition about its maximum moment of inertia axis by spinning a momentum wheel oriented perpendicular to the spin axis and increasing the speed of the momentum wheel to a value such that the spacecraft is automatically reoriented by initially a divergent spiral and finally a convergent spiral to an orientation such that the axis of the spinning momentum wheel is parallel to the total spacecraft angular momentum vector, said vector being fixed in inertial space. Nutation damping effects the final convergence of the momentum wheel axis with the angular momentum vector of the spacecraft.

Other techniques for turning a spinning spacecraft are disclosed in a NASA Report CR-232, dated May 1965, as well as an AIAA Paper No. 72-580 published April 1972, both cited and discussed in the above-identified Keigler, et al. U.S. Pat. No. 3,940,096.

An analysis of the bias momentum acquisition technique described in the Keigler, et al. U.S. Pat. No. 3,940,096 and the four references [(1–4)] enumerated above, indicates that the main thrust of these investigations has been examination of the dynamic effects of the momentum wheel spin-up. As will be discussed in the description of the invention to follow, however, there will be shown, preferably in the presence of passive energy dissipation, that the ultimate convergence to the desired attitude of of the spacecraft can be made to be substantially if not completely independent of the dynamic history of the spacecraft prior to the wheel reaching its nominal spin rate. Thus, as will be described, it will be understood that according to the principles of the present invention, a spacecraft can be oriented with any of its axes parallel to the angular momentum vector, the spacecraft being momentum biased with a momentum that is of substantially constant value.

Heretofore, the maneuver of the so-called dual-spin turn as described in the above-identified Keigler patent has been considered feasible only for reorientation from alignment of the maximum moment of inertia axis with the angular momentum vector to alignment of the intermediate or minimum moment of inertia axis with the angular momentum vector. Spacecraft, however, often separate from their launch vehicles in a state of spin about their minimum moment of inertia axes. Such a state, however, is considered to be less than ideal since spin about the maximum moment of inertia axis cannot be maintained without the use of an active stabilization system. In spite of this disadvantage, spacecraft designers often find it necessary to implement such a system as a result of a combination of two factors. The first of these is that the shape of the launch vehicle often requires the spacecraft to be mounted on the launch vehicle with its long axis (usually the minimum moment of inertia axis) aligned with the long axis of the launch vehicle. This, when coupled with the fact that spin at separation is usually imparted by spinning the upper stage of the launch vehicle about its long axis, results in the spacecraft spinning about its minimum moment of inertia axis.

Since, as mentioned above, spin about the minimum moment of inertia axis requires active stabilization, spacecraft which are launched in this mode are often placed into a different mode of operation following injection into orbit. For some future spacecraft, it is expected that this different mode of operation will be a state of spin about the inherently stable maximum moment of inertia axis or momentum bias stabilization about that axis using one or more rotors.

There are a number of methods for reorienting a spacecraft from an initial alignment of the minimum moment of inertia axis with the spacecraft angular momentum vector to alignment of the maximum moment of inertia axis with the momentum vector. The simplest method is to do nothing, since in the absence of active control, internal energy dissipation will cause a rotating spacecraft to ultimately converge to a state of spin about the maximum moment of inertia axis. The spacecraft, however, has an equal probability of converging to a state of spin in either direction about the maximum moment of inertia axis. Therefore, there are two equally probable final orientations, one at a 180° angle from the other. This ambiguity makes a totally passive reorientation unacceptable for most applications.

NASA report CR-232 mentioned above, proposes employing a momentum wheel to reorient a spacecraft from spin about the minimum of inertia axis to a bias about the maximum moment of inertia axis. In a manner similar to that of the above mentioned Keigler, et al. patent, reorientation would be performed by wheel spin-up. As shown on page 377 of the Kaplan text, reference (4) above, however, completion of wheel spin-up in this case will leave the spacecraft with the wheel angular momentum directed essentially opposite to the total angular momentum vector and with the spacecraft body spinning at a high rate. This situation is essentially a 180° C. rotation from a normal dual-spin orientation. For this reason, Kaplan (reference (4)) considers this maneuver "unacceptable." Furthermore, depending upon the wheel speed after spin-up is completed, an ambiguity similar to that described above may occur (i.e., internal energy dissipation can create an equal probability of converging to a dual-spin configuration with the wheel momentum aligned either with or opposite to the spacecraft total angular momentum vector).

A technique is needed for providing a means to reorient any momentum stabilized spacecraft from a spinning or biased state (including so-called "tumbling" modes) about any of its axes including its non-principal axes to a spinning or biased state about any other axis to be aligned with the angular momentum vector of the spacecraft. This reorientation should be achieved independently of the initial conditions.

SUMMARY OF THE INVENTION

In a method and system embodying the invention, a predetermined axis of a momentum stabilized vehicle is oriented to coincide with the total angular momentum vector of the vehicle by rotating at least one rotor to a rate such that the desired attitude represents a unique rotational kinetic energy minimum for the platform of the spacecraft. The vehicle axis which is parallel to the rotor axis will be aligned with the total vehicle angular momentum vector, said vehicle momentum vector being essentially fixed in inertial space.

DETAILED DESCRIPTION OF THE PREFERRED EMBODIMENT

Figure 1:
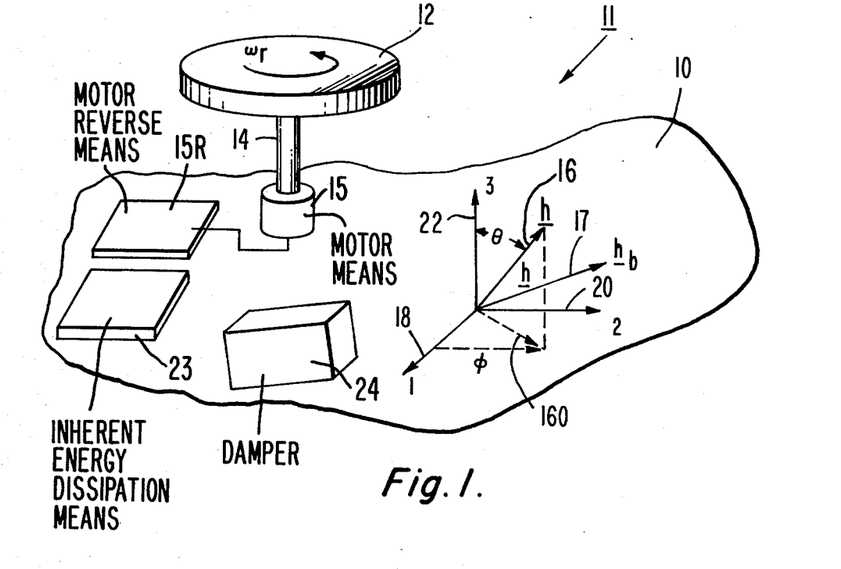
FIG. 1 is a diagram of a dual-spin spacecraft embodying the invention.

The invention will be described for use in a typical spacecraft of any form. Referring to FIG. 1, the spacecraft (at times designated "vehicle") 11 includes a body (at times designated "platform") 10 with arbitrary inertial properties and one or more rotors embodied in one form as a single momentum wheel 12 rotating about a shaft 14 and driven by a motor means 15 which spins-up and then drives the wheel at any desired but constant rate $\omega_r$ relative to the spacecraft body 10. A suitable energy dissipator 24 such as a damper serves to reduce the kinetic energy due to rotational motion of the platform or body 10 as will be explained in detail.

The body or platform 10 is arranged with means to dissipate energy at a rate greater than the rate of energy dissipation of the momentum wheel (i.e., the rotor) 12. The means for achieving energy dissipation is accomplished by suitable design of the platform as will be discussed further. The energy dissipation means of the platform 10 as arranged is represented by block 23 in FIG. 1, and will be understood to be included, although not shown, in the embodiments illustrated in FIGS. 4-11. For convenience, this block (23) will be designated "inherent energy dissipation means." Damper 24, is provided, in addition to energy dissipation means 23, to dissipate energy at a significantly higher rate, if needed, than means 23 to reduce nutation damping time more rapidly, as will be discussed in more detail hereinafter.

Motor means 15 of known form includes a suitable motor and control circuits for rotating the motor and thus rotor 12 in a direction and at any given rate as desired. Furthermore, suitable reversing means 15R of known form is connected to motor means 15 for reversing the direction of rotation of the motor and for rotating the motor in the reversed direction of rotation at any given rotation rate. A typical system having a momentum wheel in a spacecraft is described in the above-identified U.S. Pat. No. 3,940,096.

The discussion of principles and definitions which follow is included to help the reader to understand the invention:

H is the magnitude of the total angular momentum vector (h) of the spacecraft 11 comprised of (1) the body 10 itself containing in addition other components not essential to this invention including all or part of the payload of the spacecraft and other components such as transponders, motors, and the like, and (2) all the rotors 12.

In the absence of externally applied torques, (e.g., thruster torques) the angular momentum vector ($h$) of a spacecraft 11 will be conserved. Hence, the angular momentum vector ($h$) will remain constant in magnitude, and most importantly, the orientation of the momentum vector will be constant relative to inertial space. Internal torquing between various components of the spacecraft can result in an exchange of momentum between these components. The total momentum of the system, however, will remain unchanged.

The invention takes advantage of these physical laws concerning momentum. Specifically, a means of momentum exchange coupled with kinetic energy dissipation is used to bring a preselected spacecraft axis into alignment with the angular momentum vector ($h$). The axis is thus aligned with a known direction in inertial space.

Momentum bias is a steady-state condition in which the spacecraft contains one or more spinning rotors (momentum wheel 12), the total angular momentum of the rotor(s) being aligned with the total angular momentum vector (16) of the entire spacecraft 11. Usually only one wheel (12) or rotor is employed. With one important exception, the wheel speed required for the bias to be stable is identical to the speed required to practice the invention. The exception is when the axis to be aligned with the momentum vector ($h$) is the maximum moment of inertia ($I_{max}$) axis.

Unlike angular momentum, kinetic energy is (in general) not conserved. Changing the relative rotation rate between spacecraft elements by internal torquing can change the total rotational kinetic energy even though the total angular momentum ($h$) must remain constant. Passive or active motion dampers (24) can be used to decrease the total rotational kinetic energy, or, as in the practice, of this invention, reduce the kinetic energy due to rotational motion, mentioned above, of the body portion 10 of the spacecraft.

Figure 2:
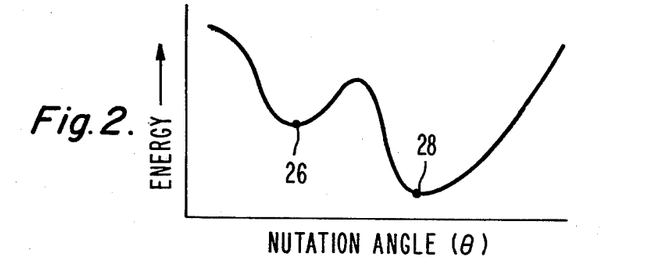
FIGS. 2 and 3 are plots of energy relationships illustrating the principle of the invention.

In the presence of energy dissipation, the spacecraft (or that portion on which a damper (24) is mounted or inherent energy dissipation means 23 is provided) will converge to an energy minimum which is consistant with the angular momentum of the spacecraft. It should be understood that an energy minimum is a state in which any small deviation from that state results in an increase in energy. More than one such state can exist. In the energy diagram shown in FIG. 2, both points 26 and 28 are minima even though point 28 has a lesser value than point 26. Here, point 26 is a "relative minimum" while 28 is an "absolute minimum." A spacecraft must have at least one rotational energy minimum but it may have two or more.

Figure 3:
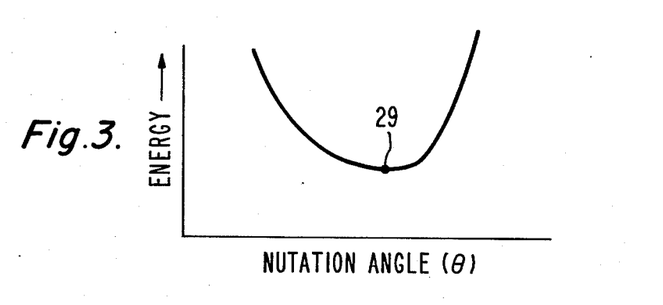

The principle of the invention depends upon operating the spacecraft such that only one ("unique") body (or platform) rotational kinetic energy minimum exists and such that this "unique" minimum occurs (as at point 29 of FIG. 3) when a preselected axis is aligned with the angular momentum vector ($h$), as will be further explained. When this condition is achieved, energy dissipation will cause convergence to the required orientation regardless of the initial state of the system. If the spacecraft does not have a unique minimum, it is possible for it to converge to an unwanted orientation. Such an unwanted orientation can be described as an "energy trap." The present invention eliminates such traps by spinning one or more rotors at sufficiently high rates.

The spin of a rigid spacecraft about a principal axis is characterized by the absence of gyroscopic torques. In other words, if a rigid spacecraft (in contrast to a spacecraft containing spinning rotors) is placed in a state of pure spin about a principal axis, it will remain in that state without the aid of steadying externally applied torques such as by thrusters. Steady spin about a non-principal axis, on the other hand, cannot occur without externally applied torques.

A rigid spacecraft (or any rigid body) has three principal axes which form a mutually perpendicular set. The maximum moment of inertia axis and the minimum moment of inertia axis are always principal axes and they are always at right angles to each other. The third principal axis is called the intermediate momentum of inertia axis. It is the axis perpendicular to both the maximum and minimum axes.

It is possible for more than three principal axes to exist. This occurs when the inertias about two of the principal axes are equal. In this situation there are an infinite number of principal axes forming an infinite number of mutually perpendicular sets of three. An example of this is a cylinder. The symmetry axis of a cylinder is a principal axis and any axis perpendicular to the symmetry axis and passing through the center of mass is also a principal axis. Thus, there will be either one maximum axis and an infinite number of minimum axes or one minimum axis and an infinite number of maximum axes. In this situation there is no intermediate axis.

Another example is a perfect sphere in which the inertia of each axis passing through the center of mass is the same as the inertia about every other such axis. Many regular solids are inertially equivalent to spheres (i.e., every axis passing through the center of mass is a principal axis). A cube falls into this class as does a cylinder if the inertias about the symmetry axis and the perpendicular axes are equal.

As known in the art, and for the purpose of the present description, a spinning or momentum biased spacecraft shall be understood to be gyroscopically (or rotationally) stable if a small disturbance cannot cause a large deviation from the nominal state and if energy dissipation will cause a return to the nominal state following a small deviation. The term gyroscopically stable is at times also referred to as momentum stabilized; these two terms are to be considered synonymous. For most conventional dual-spin spacecraft stability exists if the rate of energy dissipation on the body (10) exceeds the rate of energy dissipation on the rotor(s) (12). Energy dissipators (platform inherent energy dissipation means 23 and damper 24) include the flexible structure of the spacecraft as well as fluid sloshing effected by fluid dampers and thruster propellant tanks.

The angular momentum vector $h$ is indicated by vector line 16, it being understood that in the diagrams, a line with an arrow head represents a vector having both magnitude and direction (following the usual convention of the right-hand rule) relative to the appropriate coordinate axes. Furthermore, angular velocity (e.g., $\omega_r$) is also represented by a line and arrowhead indicating rotation according to the right-hand rule convention.

Axes 1-3 are mutually orthogonal coordinate axes that are considered to be fixed in the spacecraft body 10. These axes may at times be referred to by the reference numerals 18, 20, and 22, respectively. Axis 22 is parallel to the wheel rotation axis 14 and the axes 18 and 20 are chosen so that there is no product of inertia between the axis 1 and 2. This choice of axes simplifies the mathematics of describing the invention and results in no loss of generality of the principles of the invention.

The orientation of the total angular momentum vector $h$, relative to the body axes is defined as the angles $\theta$ and $\phi$. The nutation angle represented by $\theta$ is defined by the angle between the positive 3-axis (22) and $h$ (16). Furthermore, the angle $\phi$ is defined by the angle between the positive 1-axis and the projection of the momentum vector ($h$) 16 on the plane defined by the axes 1 and 2. The projection is represented by the dotted vector line 160. These angles are in general represented mathematically as functions of time. This means, of course, that the angles can change in a dynamic sense. According to the invention $\theta$ is reduced to zero from an initial non-zero value (typically from 90° or 180°).

Before proceeding with a development of the mathematical relations explaining the operation of the invention, a brief description will be made, in general terms, of the procedure for effecting the alignment of any spacecraft axis with the total angular momentum vector ($h$) according to the invention.

The purpose of the invention is to orient a preselected spacecraft axis with the spacecraft's total angular momentum vector ($h$), and thus, orient that axis with a known direction in inertial space. This is accomplished by spinning-up one or more rotors (or momentum wheels 12) to a rate(s) which equals or exceeds a critical rate(s) $\omega_c$ and maintaining the rate(s) such that the intended orientation represents a unique (i.e., the only) rotational kinetic energy minimum for the spacecraft platform 10 at those rotor rotation rates, as will be explained. Once the critical wheel speed(s) is (are) reached, passive and/or active energy dissipation means 23 and 24 on the spacecraft body 10 will cause convergence to the desired orientation regardless of the spacecraft's initial orientation and regardless of the motions experienced by the spacecraft during wheel spin-up.

In the preferred embodiment, only one symmetric rotor (or wheel 12) is employed and energy dissipation (24) is performed passively.

The wheel 12 is oriented within the spacecraft so that its spin axis 14 is parallel to the spacecraft axis 22 which is to be oriented with the total angular momentum vector. Completion of the reorientation maneuver will leave the wheel axis 14 oriented so that the angular momentum vector of the wheel 12 lies in the same direction as the total spacecraft angular momentum vector (h). The wheel speed required for successful reorientation depends upon the spacecraft's inertial (mass) properties and upon the choice of the axis to be aligned with the momentum vector (h). For all but one choice of axis, the requirement is identical to the requirement for stability of a momentum bias about that axis. The exception is the maximum moment of inertia axis. The nature of the requirements fall into three distinct categories as will be explained more fully hereinafter.

The dissipation of energy may be effected by a passive motion damper 24 including the inherent energy dissipation means 23 previously mentioned propellant slosh, etc.) the motion damper orientation being along any axis but preferably along an axis perpendicular to the wheel axis. In addition, active nutation dampers of the type described in U.S. Pat. No. 3,695,554, issued to K. J. Phillips on Oct. 3, 1972, and U.S. Pat. No. 3,830,447, issued to K. J. Phillips on Aug. 20, 1974, may be used for the final orientation.

After the preselected spacecraft axis has been aligned with the total angular momentum vector of the spacecraft, the respective momentum wheel speeds may be operated to any bias level consistent with the stability requirements of the spacecraft.

As previously discussed, the maneuver described will proceed even with energy dissipation means 23 inherent in the spacecraft. It is important to note, as indicated above, that for most configurations it is necessary that the dissipation rate on the spacecraft body (10) exceeds the dissipation rate on the rotor (12). Convergence time for achieving the maneuver, however, can be minimized or, at least reduced, with an appropriately designed passive damper (24). Furthermore, as previously indicated, it is also possible to employ an active motion damper (24) through all or even part of the maneuver. It should be understood, however, that the only active control that is required in the practice of the invention is in the operation of one or more momentum wheels at essentially constant speed about their respective axes.

The mathematics of the energy analysis upon which the principles of the invention are based will now be described.

The magnitude of the total angular momentum ($H_r$) of the momentum wheel 12 about its axis 14 due to the combined effects of the spacecraft body motion and rotation of the wheel relative to the spacrcraft body is given by equations (1) and (2):

$$H_r = (\omega_3 + \omega_r) I_r \tag{1}$$

which is equivalent to:

$$H_r = (e_3^T [I_b]^{-1} h_b + \omega_r) I_r \tag{2}$$

where T is the conventional notation denoting the transposition of a vector or matrix, $\omega_3$ is the 3-component of the body angular rate, $e_3$ is a unit vector in the 3-direction (22), $h_b$ is the angular momentum of the spacecraft body including the component of wheel momentum perpendicular to its symmetry axis, $I_r$ is the inertia of the wheel (12) about its axis (14), and $[I_b]$ is the inertia matrix of the body 10 derived as follows:

The inertia matrix of the entire spacecraft is defined as a 3×3 matrix $[I_s]$. All product of inertia terms include the negative sign. Accordingly, the matrix $[I_b]$ is defined as being identical to the matrix $[I_s]$ with the exception of the 3—3 term which, in $[I_b]$, excludes the wheel inertia $I_r$. Thus, the matrices $[I_b]$ and $[I_s]$ are:

$$[I_b] = \begin{bmatrix} I_{11} & 0 & I_{13} \\ 0 & I_{22} & I_{23} \\ I_{31} & I_{32} & I_{33} \end{bmatrix} \tag{3}$$

and $$[I_s] = \begin{bmatrix} I_{11} & 0 & I_{13} \\ 0 & I_{22} & I_{23} \\ I_{31} & I_{32} & (I_{33} + I_r) \end{bmatrix} \tag{4}$$

where $I_{11}$ is the moment of inertia of the entire spacecraft about the 1-axis, $I_{22}$ is the amount of inertia of the entire spacecraft about the 2-axis, $I_{33}$ is the moment of inertia of the entire spacecraft about the 3-axis minus the rotor inertia $I_r$, $I_{13}$ and $I_{31}$ are the negative of the product of inertia between the 1 and 3-axes, and $I_{23}$ and $I_{32}$ are the negative of the product of inertia between the 2 and 3-axes.

Symbols for the determinants of $[I_s]$ and $[I_b]$ are respectively $\Delta_s$ and $\Delta_b$. From the definition of the inertia matrices, and noting that the axes are chosen so that $I_{12} = I_{21} = 0$, the determinants are seen to be related by the equation:

$$\Delta_s = \Delta_b + I_{11} I_{22} I_r \tag{5}$$

As previously indicated, H is the magnitude of the total spacecraft angular momentum vector. The vector $h_b$ (17—FIG. 1) can be resolved into components along the respective axes 1, 2, and 3. Utilizing these components, Equation (2) can be expanded as follows:

$$H_r = I_r \Delta_s^{-1} [I_{11} I_{22} H \cos\theta - H f(\phi) \sin\theta + \omega_r \Delta_b] \tag{6}$$

where $$f(\phi) = I_{11} I_{23} \sin\phi + I_{22} I_{13} \cos\phi \tag{7}$$

where $I_{11}$ is the moment of inertia about the 1 axis as defined for matrices (3) and (4); further $I_{23}$ is the negative of the product of inertia between the 2 and 3 axes;

$I_{22}$ is the moment of inertia about the 2 axis; and $I_{13}$ is the negative of the product of inertia between the 1 and 3 axes.

These terms are well known as components of the inertia matrix of a spacecraft treated as a simple rigid body. The axes of the spacecraft according to this description are chosen as noted above so that $I_{12} = I_{21} = 0$.

The rotational kinetic energy ($E_s$) of the entire spacecraft 11 is given by:

$$E_s = (\tfrac{1}{2}) h_b^T [I_b]^{-1} h_b + (\tfrac{1}{2}) I_r^{-1} H_r^2 \tag{8}$$

The energy analysis, however, is not directed to the entire spacecraft but is directed only toward that portion of the rotational kinetic energy of the spacecraft 11 which is due to body rates alone and which is, therefore, most directly effected by body-mounted dissipation mechanisms. The term "body rates" should be understood to mean the rotational motion of the body (10) of the spacecraft (11) as distinguished from the motions of components within or relative to the body.

Accordingly, with this limitation, the portion of the kinetic energy relating to body rates alone is equal to the body rotational kinetic energy plus that portion of the momentum wheel energy which is due to body rotation alone and is given by:

$$E = (\tfrac{1}{2}) h_b^T [I_b]^{-1} h_b + (\tfrac{1}{2}) I_r^{-1} (H_r - I_r \omega_r)^2 \qquad (9)$$

Substituting equation (6) into equation (9) and expanding the components of the body angular momentum vector ($h_b$) in terms of $\theta$ and $\phi$ yields the following:

$$\begin{aligned} E(\theta,\phi) &= (\tfrac{1}{2}) I_{11} I_{22} \Delta_s^{-1} (\omega_r^2 I_r^2 + H^2 \cos^2\theta) + \\ &\quad (\tfrac{1}{2}) \{I_{33}(I_{22}\cos^2\phi + I_{11}\sin^2\phi) - (I_{23}\cos\phi - I_{13}\sin\phi)^2 - \\ &\quad I_r \Delta_s^{-1}[f(\phi)]^2\} H^2 \Delta_b^{-1} \sin^2\theta - \\ &\quad H^2 \Delta_s^{-1} f(\phi) \cos\theta \sin\theta + \\ &\quad \omega_r I_r H \Delta_s^{-1} \{f(\phi) \sin\theta - I_{11} I_{22} \cos\theta\} \end{aligned} \qquad (10)$$

If a passive body-mounted motion damper (such as an energy dissipating nutation damper 24 or inherent energy dissipation means 23 alone is provided on the spacecraft (11) then the energy [$E(\theta,\phi)$] will tend towards a minimum value. If the system parameters are chosen so that, in fact, an energy minimum does exist at the orientation where $\theta=0$, and the minimum is unique, i.e., it is the only minimum (point 29, FIG. 3), the wheel axis 14 will ultimately become aligned with the total angular momentum vector ($h$) 16 regardless of the initial conditions of the spacecraft. From conventional mathematical analysis it will become apparent as will be described, that the energy minimum at $\theta=0$ is "unique" for the critical rate of rotation or, in certain configurations, for rates of rotation that are greater than the critical rate. A different critical rate of rotation can establish a different magnitude for the "unique" platform rotational energy minimum provided the conditions just stated are established.

Employing conventional mathematical analysis, examination of the first and second partial derivatives of E ($\theta,\phi$) (equation 0) reveals the requirements for E ($\theta,\phi$) to have a unique minimum at the spacecraft orientation where $\theta=0$, or $\theta=180°$ as will be explained.

Specifically, the first partial derivatives of E ($\theta,\phi$) are used to determine those values of $\theta$ and $\phi$ which may possibly be maxima or minima. These so-called "critical points" are the solutions of $$\frac{\partial E}{\partial \theta} = \frac{\partial E}{\partial \phi} = 0.$$

The second partial derivatives $$\frac{\partial^2 E}{\partial \theta^2}, \frac{\partial^2 E}{\partial \theta^2}, \text{ and } \frac{\partial^2 E}{\partial \theta \partial \phi}$$

are then used to determine the nature of the critical points and therefore to determine the requirements for the orientation where $\theta=0$ to be a minimum and for all other critical points to be other than minima. Thus, the uniqueness criterion and therefore the convergence criterion is established.

As indicated above, the criteria for convergence can be divided into three categories based upon the choice of axis for alignment and stability. These will now be described as Cases I, II, and III. Case I: In this case the wheel axis and therefore the axis of convergence, is aligned with either the minimum moment of inertia axis or the intermediate principal axis [i.e., ($I_{33}+I_4$) is either the minimum or intermediate moment of inertia of the entire spacecraft]. Convergence will occur if the wheel speed $\omega_r$ exceeds a critical speed $\omega_c$ where:

$$\omega_c = HI_r^{-1}[1-(I_{33}+I_r)I_{max}^{-1}] \qquad (11)$$

Note that $I_{max}$ is the maximum moment of inertia of the entire spacecraft. Case II: In this case the wheel axis is aligned with the maximum moment of inertia axis of the entire spacecraft (11). Convergence will occur if the wheel rate $\omega_r$ exceeds a critical wheel speed $\omega_c$ where:

$$\omega_c = HI_r^{-1}[(I_{33}+I_r)I_p^{-1} - 1] \qquad (12)$$

Here as contrasted with equation (11) ($I_{33}+I_r)=I_{max}$ and $I_p$ is the greatest moment of inertia about an axis perpendicular to the wheel axis, and passing through the center of mass of the spacecraft.

The condition for stability of this orientation is:

$$\omega_r > HI_r^{-1}[1-(I_{33}+I_r)I_{min}^{-1}] \qquad (13)$$

where $I_{min}$ is the spacecraft's minimum moment of inertia. This requirement of stability is less stringent, it should be noted, than the convergence requirement (equation 12).

Case III: For this case the wheel axis is aligned with a non-principal axis. Unlike Cases I and II which have an infinite range of acceptable wheel speeds, convergence here will occur for only one wheel speed. This critical speed is given by:

$$\omega_c = HI_r^{-1} \qquad (14)$$

where the parameters are as previously defined.

Furthermore, the convergence requirements for Cases I and II can be expressed by one relationship as follows:

$$\omega_r > \omega_c = HI_r^{-1}|1-(I_{33}+I_r)I_p^{-1}| \qquad (15)$$

where | | denotes the absolute value of the parameters therebetween and $I_p$ is the greatest moment of inertia about an axis perpendicular to the wheel axis, and passing through the center of mass of the spacecraft. Thus relationship (15) alone covers the case of principal axis alignment and equation (14) covers the case of non-principal axis alignment with the angular momentum ($h$) of the spacecraft. It should further be noted that the convergence requirements of Cases I and III and the requirements for stability of the ultimate orientations for those cases are identical. Case II, however, has stability and convergence requirements which differ from each other as explained above.

Several orientation maneuvers which can be performed by applying the principles of the invention as shown in FIGS. 4–10 will now be described.

Figure 11:
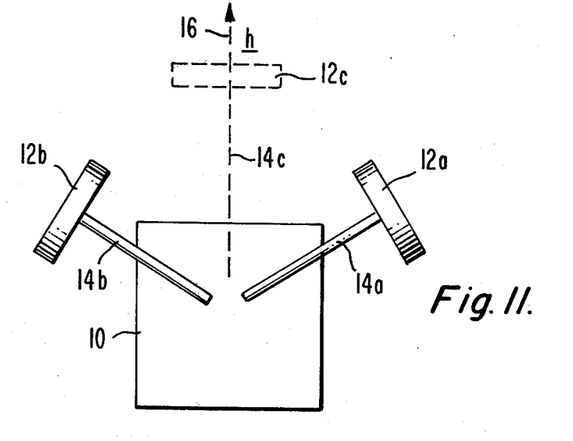
FIG. 11 is a schematic illustrating an embodiment using two rotors.

Each of the diagrams of the spacecraft 11 includes a rotor 12 rotating about a shaft 14. It should be understood that the rotor 12 and its shaft 14 may be positioned anywhere within or on the spacecraft body. Furthermore, a plurality of rotors 12 may be utilized as shown in FIG. 11 to be described. The array of such rotors (12) can be arranged to have individual controls for the speed and direction of rotation of the individual rotors but so arranged in combination that the resultant and therefore the effective angular momentum of the rotors may be aligned with any desired spacecraft axis. By such an arrangement of a plurality of rotors, then it will be understood, a spacecraft of a given structural configuration may be operated in orbit to change its orientation with respect to the total angular momentum vector ($h$) of the satellite.

Figure 4:
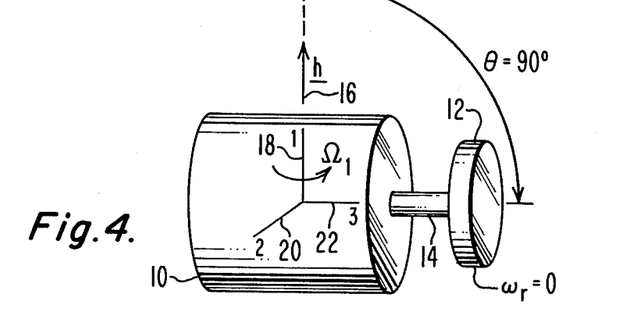
FIGS. 4-10 are simplified diagrams indicating orientations of a vehicle embodying the invention.
Figure 5:
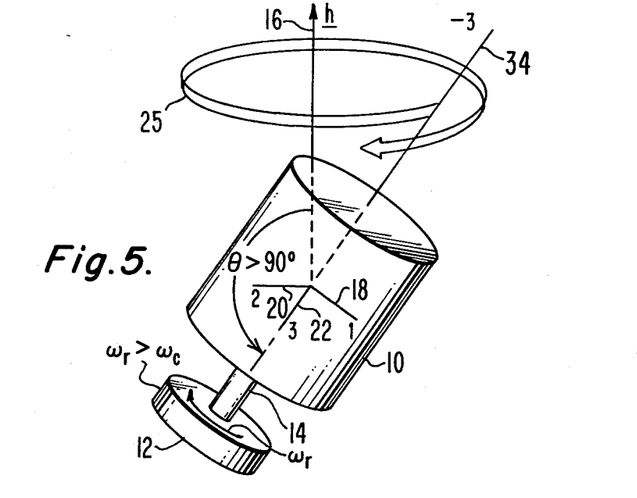
Figure 6:
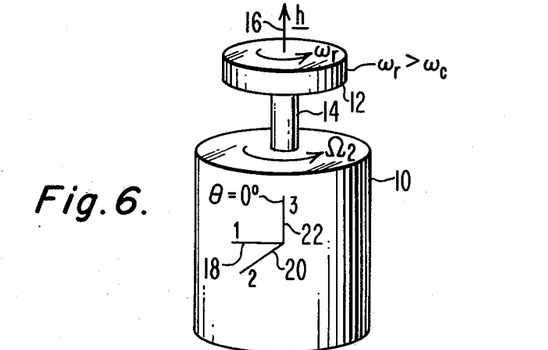

An orientation from a state of spin about the minimum moment of inertia axis to a momentum bias about the maximum moment of inertia axis embodying a Case II configuration is illustrated in FIGS. 4–6. FIG. 4 shows the spacecraft in its initial state with the spacecraft spinning at a rate $\Omega_1$ about the 1-axis 18 (the minimum moment of inertia axis) and with the wheel 12 at a zero spin rate relative to the spacecraft body 10. The wheel 12 is aligned with the maximum moment of inertia axis (the 3-axis 22).

Orientation is initiated by spinning-up the wheel 12 to a rate $\omega_r$ greater than the critical rate $\omega_c$ given by equation (12) for this configuration. Wheel spin-up torquing applies reaction torques to the spacecraft body 10 and thereby causes the spacecraft 11 to assume an orientation in which the angle $\theta$ between the 3-axis 22 and the momentum vector 16 is greater than the initial 90° approaching a value of nearly 180°. The vehicle orientation and motion following wheel spin-up are depicted in FIG. 5. The motion is characterized by a spiral movement (25) during which the negative 3-axis (34) diverges from, and the positive 3-axis (22) converges toward, the angular momentum vector 16.

The intended final orientation occurs when the positive 3-axis 22 becomes aligned with vector $h$ (16), i.e., $\theta = 0$ (FIG. 6). If, however, the wheel speed $\omega_r$ were less than $\omega_c$, the spacecraft could converge to either the desired orientation (FIG. 6) or an inverted orientation in which $\theta = 180°$. The latter orientation is an energy trap of the type described above. The trap and therefore the ambiguity are eliminated by increasing the wheel speed to a rate exceeding the critical value of $\omega_c$. Energy dissipation will then cause convergence to the correct and desired orientation as depicted in FIG. 6. In this final orientation, the body will spin at a rate $\Omega_2$ which is consistent with the total angular momentum ($h$) of the vehicle in accordance with the following equation:

$$\Omega_2 = (H - \omega_r I_r)(I_{33} - I_r)^{-1} \quad (16)$$

The configuration of FIG. 6 is an example of a stable dual-spin spacecraft. Following completion of the orientation, the wheel speed may be adjusted to any rate consistent with the stability requirements of equation (13) even if it is less than the critical value $\omega_c$.

It should be noted that in this Case II example, the spacecraft has been oriented from an initial state of spin about the minimum moment of inertia axis. This is an initial orientation that may be prevelant in spacecraft of the future and is an example of a maneuver which heretofore has been considered difficult, if not impossible, to achieve. (See the Kaplan test, supra, pages 371). Furthermore, an energy dissipator (FIG. 1) in the form of a motion damper 24, or at least the inherent platform energy dissipation mechanism 23 as described above, may be utilized to serve two functions. In addition to acting as a mechanism to ensure reorientation, the motion damper is utilized to ensure stability of the final orientation by providing an energy dissipation rate on the platform (body 10) that is greater than the energy dissipation rate on the rotor 12. In certain spacecraft, the rotor 12 is typically a rigid symmetrical structure. On such rigid rotors, the energy dissipation is a minimum, if not negligable. However, in other spacecraft, the rotor is not a simple rigid structure and may include means of significant energy dissipation. In such spacecraft, design precautions are required to assure that the dissipation rate on the platform exceeds the dissipation rate on the rotor.

Figure 7:
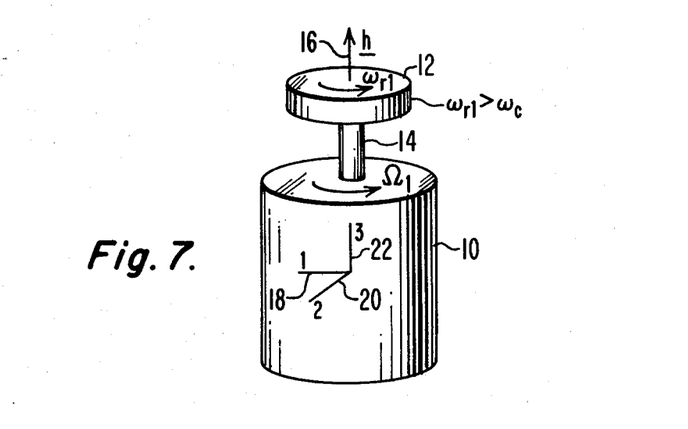
Figure 8:
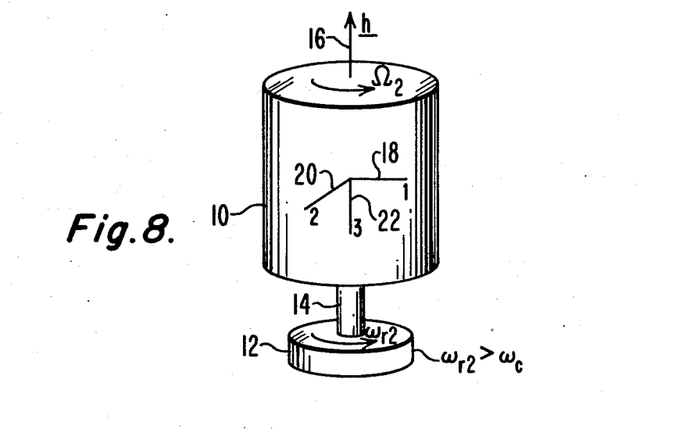

The initial and final orientations of a Case I maneuver are shown in FIGS. 7 and 8, respectively. The spacecraft is initially in a stable dual-spin configuration with the wheel aligned with either the minimum or intermediate moment of inertia axis. Since this initial orientation (FIG. 7) is stable, and furthermore, since this is a Case I configuration, the kinetic energy (equation 10) due to body rotation alone is initially at a unique minimum at the rotor rate wherein $\omega_r = 10 7_{r1}$. Thus, the body 10 has an initial spin rate $\Omega_1$ about the 3-axis and the wheel rate $\omega_{r1}$ meets stability requirements by being greater than $\omega_c$ where $\omega_c$ is given by equation (11).

Inversion of the spacecraft is initiated by reversing the wheel so that the new wheel rate ($\omega_{r2}$) exceeds $\omega_c$ in magnitude but is opposite $\omega_{r1}$ in sign. This establishes a new unique minimum for the energy expressed by equation (10), wherein $\omega_r = \omega_{r2}$, and $\theta = 180°$. This unique minimum is manifested at the inverted orientation of the spacecraft as shown in FIG. 8. It should be noted that energy dissipation on the spacecraft body caused the inversion to occur. Following the inversion, the body will have a spin rate $\Omega_2$ about the negative 3-axis in accordance with equation (16). Following completion of the orientation, the wheel speed may be adjusted to any rate consistent with stability requirements.

The inversion maneuver illustrated in FIGS. 7 and 8 are applicable to any spacecraft configuration. Accordingly, provided the spacecraft is gyroscopically stable about any axis in its initial state (FIG. 7) it can be inverted 180°, similarly as FIG. 7 to FIG. 8.

Furthermore, it should be noted, the invention provides orientation of a spacecraft from an orientation that is inherently gyroscopically unstable in the absence of a momentum bias.

It should be noted that the orientation disclosed in the above-identified Keigler, et al. patent is initiated from a state of spin about the maximum moment of inertia axis which is the only orientation which is inherently gyroscopically stable in the absence of a momentum bias.

Figure 9:
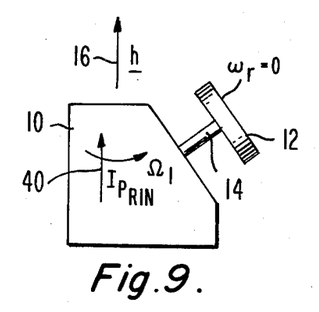
Figure 10:
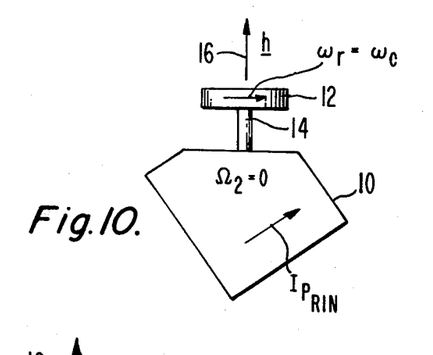

Referring now to FIGS. 9 and 10, there is shown an example of a spacecraft in which the wheel is skewed relative to a principal axes 40 which is initially aligned with the angular momentum vector 16, the spacecraft being initially in a state of spin ($\Omega_1$) about said principal axis and the rotor being initially in a state of rest relative to the spacecraft body. Causing the rotor to operate at the critical speed $\omega_c$ as defined by equation (14) the spacecraft will converge to the position shown in FIG. 10 where the body spin rate $\Omega_2 = 0$. In the final orientation, the rotor is in line with the angular momentum vector 16. It should be understood that the principal axis 40 can be any of the three spacecraft principal axes.

As previously described, the invention may be practiced using a single rotor whose axis is parallel with the desired attitude axis. In the alternative, a plurality of rotors may be used and so operated such that the resultant angular momentum vector of the rotors coincides with the total angular momentum vector of the vehicle. For example, referring now to FIG. 11, there is shown a vehicle 11 having a first rotor 12a rotating about its axis 14a and a second rotor 12b rotating about its axis 14b.

The spacecraft is in the desired orientation when the resultant angular momentum of rotors 12a and 12b is aligned with the angular momentum vector h (16). The resultant of the rotor angular momentum can be represented by an equivalent rotor 12c which spins about an axis 14c. Suitable controls are provided to control rotors 12a and 12b to achieve the resultant rotor 12c.

In operation, the spacecraft system is commanded by an internal or external signal to spin-up the rotor 12, or the plurality of rotors 12c (FIG. 11), and control the rotor or rotors at a rate of rotation to bring about the orientation desired. Reference is made to the above-identified Keigler, et al. patent for a description of a system comprising components useful in practicing the present invention.

Spacecraft or vehicle 11 in orbit includes many components not necessary for the operation of the orientation and maneuvers according to the present invention. Such components are well known in the art and need not be described for the purposes of the present invention.

For the examples given, it will now be appreciated that in accordance with the present invention, an unambiguous stable momentum bias can be acquired from any artibrary initial rotating or momentum biased state. The spacecraft orientation associated with the unique minimum of the enery defined by equation (10) is determined by the fixed total spacecraft angular momentum (h) and by the rate of rotation of the rotor ($\omega_r$). Furthermore, the magnitude of the energy at the unique minimum (equation 10) is a function of the rotor speed. There exists a plurality of unique energy minima at $\theta = 0$ the magnitude of each minimum being manifested by a particular rotor rate ($\omega_r$) that is nevertheless greater than the critical rate $\omega_c$ for Cases I and II or equation (14) to the critical rate $\omega_c$ for Case III.

What is claimed is:

1. A method of orienting a vehicle in inertial space from an initial orientation to a final desired orientation, said vehicle having three principal axes that are mutually orthogonal, wherein one of said principal axes defines the maximum moment of inertia axis of said vehicle, said vehicle further having a total angular momentum the vector of which being essentially constant in inertial space, said maximum moment of inertia axis not being initially in alignment with said vector of the total angular momentum of said vehicle and said vehicle having a platform and a rotor adapted for rotation about a preselected axis on said platform, which preselected axis is fixed relative to said platform, said preselected axis having an initial axial orientation relative to inertial space which is different by a certain angle from a desired final axial orientation, said final desired orientation being parallel to the total angular momentum vector, comprising the steps of:

rotating said rotor to a constant rate of rotation such that the platform rotates in a given direction and rate of rotation, said constant rate of rotation of said rotor selected to produce a unique minimum of kinetic energy due to platform rotation at said desired orientation;

said unique minimum of kinetic energy defining an energy state wherein no other minimum of kinetic energy due to platform rotation exists for said constant rate of rotation; and dissipating rotational kinetic energy on the platform of said vehicle at a rate greater than the rate of energy dissipation of said rotor;

whereby as the energy of said platform is dissipated at a greater rate than the energy dissipated by said rotor, said rotor axis converges to said final desired orientation in which the axis of rotation of said rotor coincides with the total angular momentum vector and said vehicle is momentum stabilized.

2. A method according to claim 1 wherein said energy dissipating step further comprises dissipating the energy at a significantly higher rate on said platform than the rate of energy dissipation on said rotor whereby the time of convergence of said vehicle to the desired orientation is substantially reduced.

3. A method according to claim 1, wherein said three principal axes includes one minimum moment of inertia axis and said vehicle is initially spinning about said one minimum moment of inertia axis, said minimum moment of inertia axis being initially aligned with the total angular momentum vector, and said preselected axis of said rotor is initially aligned parallel to said maximum moment of inertia axis, further comprising the step of rotating said rotor about an axis parallel to the maximum moment of inertia axis at a constant rate, whereby said maximum moment of inertia axis converges to substantial coincidence with said total angular momentum vector.

4. A method according to claim 1 wherein said preselected axis of said rotor is initially aligned in a direction parallel to the total angular momentum vector of said vehicle and wherein said rotor is initially rotating in a direction and at said first mentioned constant rate to produce a first unique minimum of kinetic energy due to platform rotation at said desired orientation, further comprising the step of:

reversing the direction of rotation of said rotor and thereafter rotating said rotor to a second constant rate of rotation to produce a second unique minimum of kinetic energy due to platform rotation at said desired orientation, said second unique minimum defining an energy state wherein no other energy minimum exists for said second constant rate of rotor rotation, whereby said rotor axis converges into alignment with said total angular momentum vector in a direction 180° opposite to the initial alignment of said rotor axis.

5. A method according to claim 1, wherein said vehicle is initially in a state of spin about one of said principal moment of inertia axes, and said one principal moment of inertia axis is initially in alignment with the total angular momentum vector, said rotor having inertia about its said preselected axis and being oriented along an axis that is skewed relative to said one principal moment of inertia axis, said rotor being further initially at rest relative to said platform, further comprising the step of rotating said rotor to a rate of rotation equal to said total angular momentum of said vehicle divided by the inertia of said rotor, whereby said preselected axis of said rotor converges to alignment with said total angular momentum vector.

6. A method according to claim 1 wherein said vehicle further includes a plurality of rotors, each rotor positioned to rotate about a different axis of said vehicle, further comprising the step of:

rotating each of said rotors to a respective constant rate of rotation such that the resultant angular momentum vector of said rotors converges to coincide with the total angular momentum vector of said vehicle.

7. A system for orienting a vehicle in inertial space, said vehicle having three principal axes that are mutually orthogonal, wherein at least one of said principal axes defines the maximum moment of inertia axis of said vehicle, said vehicle further having a total angular momentum the vector of which being essentially constant in inertial space, said maximum moment of inertia axis being not initially in alignment with said vector of the total angular momentum of said vehicle, and said vehicle having a platform and a rotor adapted for rotation about a preselected axis on said platform, which preselected axis is fixed relative to said platform, said preselected axis having an initial axial orientation relative to inertial space which is different by a certain angle from a desired final axial orientation being parallel to the total angular momentum vector, comprising:

means for rotating said rotor to a constant rate of rotation whereby the platform is rotated in a given direction and rate of rotation, said constant rate of rotation selected to produce a unique minimum of kinetic energy due to the rotation of said platform at said desired orientation;

said unique minimum of kinetic energy defining an energy state wherein no other minimum of kinetic energy due to platform rotation exists for said constant rate of rotation; and means to dissipate rotational kinetic energy on the platform of said vehicle at a rate greater than the rate of energy dissipation of said rotor;

whereby as the energy of said platform is dissipated at a greater rate than the energy dissipated by said rotor, said rotor axis converges to said final desired orientation in which the axis of rotation of said rotor coincides with the total angular momentum vector and said vehicle is momentum stabilized.

8. A system according to claim 7 wherein said energy dissipation means on said platform further includes nutation damper means for dissipating energy at a significantly higher rate on said platform than the rate of energy dissipation on said rotor whereby the time of convergence of said vehicle to the desired orientation is substantially reduced.

9. A system according to claim 7, wherein said three principal axes includes one minimum moment of inertia axis and said vehicle is initially spinning about said one minimum moment of inertia axis, said minimum moment of inertia axis being initially aligned with the total angular momentum vector, and said preselected axis of said rotor is initially aligned parallel to said maximum moment of inertia axis, further comprising means for rotating said rotor about an axis parallel to the maximum moment of inertia axis at a constant rate, whereby said maximum moment of inertia axis converges to substantial coincidence with said total angular momentum vector.

10. A system according to claim 7 wherein said preselected axis of said rotor is initially aligned in a direction parallel to the total angular momentum vector of said vehicle and wherein said rotor is initially rotating in a direction and at said first mentioned constant rate to produce said unique minimum of kinetic energy due to rotation of said platform at said desired orientation, further comprising:

means for reversing the direction of rotation of said rotor and thereafter rotating said rotor to a second constant rate of rotation to produce a second unique minimum of kinetic energy due to platform rotation at said desired orientation, said second unique minimum defining an energy state wherein no other energy minimum exists for said second constant rate of rotor rotation, whereby said rotor axis converges into alignment with said total angular momentum vector in a direction 180° opposite to the initial alignment of said rotor axis.

11. A system according to claim 7, wherein said vehicle is initially in a state of spin about one of said principal moment of inertia axes, and said one principal moment of inertia axis is initially in alignment with the total angular momentum vector, said rotor having inertia about its said preselected axis and being oriented along an axis that is skewed relative to said one principal moment of inertia axis, said rotor being further initially at rest relative to said platform, further comprising means for rotating said rotor to a rate of rotation equal to said total angular momentum of said vehicle divided by the inertia of said rotor;

whereby said preselected axis of said rotor converges to alignment with said total angular momentum vector.

12. A system according to claim 7 wherein said vehicle further includes a plurality of rotors, each rotor positioned to rotate about a different axis of said vehicle, further comprising means for:

rotating each of said rotors to a respective constant rate of rotation such that the resultant angular momentum vector of said rotors converges to coincide with the total angular momentum vector of said vehicle.

* * * * *

UNITED STATES PATENT AND TRADEMARK OFFICE
CERTIFICATE OF CORRECTION

PATENT NO. : 4,275,861

DATED : June 30, 1981

INVENTOR(S) : Carl Henry Hubert

It is certified that error appears in the above-identified patent and that said Letters Patent is hereby corrected as shown below:

Abstract, line 1, cancel "A preselected axis other than the" and substitute --The--.

Column 9, line 50 after "equation" cancel "0" and substitute --10--.

Signed and Sealed this

Sixteenth Day of December, 1986

Attest:

DONALD J. QUIGG

Attesting Officer     Commissioner of Patents and Trademarks